(12) United States Patent  (10) Patent No.: US 7,649,619 B2
Iwasaki  (45) Date of Patent: Jan. 19, 2010

(54) OPTICAL TIME DOMAIN REFLECTOMETER

(75) Inventor: Kimiaki Iwasaki, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 0 days.

(21) Appl. No.: 11/983,118

(22) Filed: Nov. 7, 2007

(65) Prior Publication Data

US 2008/0106731 A1 May 8, 2008

(30) Foreign Application Priority Data

Nov. 8, 2006 (JP) .............................. 2006-303308

(51) Int. Cl.
*G01N 21/00* (2006.01)
(52) U.S. Cl. ..................... 356/73.1; 370/535
(58) Field of Classification Search ................ 356/73.1
See application file for complete search history.

(56) References Cited

U.S. PATENT DOCUMENTS 4,968,880 A * 11/1990 Beller ................... 250/227.21
7,079,555 B2 * 7/2006 Baydar et al. ............... 370/532
7,400,387 B2 * 7/2008 Lautenschlager .......... 356/73.1

FOREIGN PATENT DOCUMENTS

JP 54-040069 3/1979
JP 06-167417 6/1994

* cited by examiner

*Primary Examiner*—Tarifur Chowdhury
*Assistant Examiner*—Tara S Pajoohi
(74) *Attorney, Agent, or Firm*—Greer, Burns & Crain, Ltd.

(57) ABSTRACT

An optical time domain reflectometer (OTDR) launches an optical pulse emitted from a pulse light source to one end side of an optical fiber, receives light returning to the one end side with an optical receiver, inputs an output signal of the optical receiver to an A/D converting unit so as to convert the signal to an N bit (N is the plural number) digital signal, implements a process for the N bit digital signal, and measures the transmission characteristics of the optical fiber. The A/D converting unit has the number of bits that is greater than the N bits by the number of A bits, wherein A is an integer greater than "0". The A/D converting unit converts an input signal to an N+A bit digital signal, and compresses the N+A bit digital signal to N bit data.

9 Claims, 6 Drawing Sheets

OPTICAL TIME DOMAIN REFLECTOMETER

BACKGROUND OF THE INVENTION

1. Field of the Invention

The present invention relates to a technique for reducing the noise occurring in an A/D converting process, in an optical time domain reflectometer (OTDR) for measuring the transmission characteristics of an optical fiber from its one end side.

2. Description of the Related Art

Conventionally, an optical time domain reflectometer (OTDR) 10 shown in FIG. 5 has been used for measuring the transmission characteristics of an optical fiber from its one end side.

This OTDR 10 launches an optical pulse emitted from a pulse light source 11 to one end side of an optical fiber 1 as a target object to be tested, through an optical coupler 12 and a port 10a. The OTDR receives the light (backscattered light or Fresnel reflection, etc.) returning to the one end side of the optical fiber 1 in response to the optical pulse, and transmits the light through the optical coupler 12 to an optical receiver 13. An amplifier 14 amplifies an output signal of the optical receiver 13, and inputs the amplified signal to an A/D converter 15. The A/D converter converts the signal to a digital signal having a predetermined number N of bits.

A memory 16 stores a series of digital signals obtained in a predetermined time period beginning from the launch of the optical pulse to the optical fiber 1 until the elapse of a predetermined period of time. A display unit 17 displays waveform data on its display screen, based on the stored N bit digital signals, as shown in FIG. 6. The displayed waveform data gives the attenuation characteristics at each position along the optical fiber 1 or the connection loss.

A controller 18 controls the emission timing of the optical pulse from the pulse light source 11, controls the gain of the amplifier 14, controls the sampling time of the A/D converter 15, and controls the address specification of the memory 16. Further, the controller 18 implements a calculation process (logarithmic process, etc.) for N bit data so as to generate waveform data to be displayed by the display unit 17.

For example, Japanese Patent No. 3002343 discloses the OTDR having the above configuration.

The A/D converter 15 of the thus formed OTDR 10 outputs a voltage in the range of 0 to 1023 mV, for example, where N=10 and a 1 bit equivalent voltage Vr is 1 mV, thus having a dynamic range of 1000 times. However, such the dynamic range of the A/D converter 15 is insufficient by itself for a high optical feedback from a near end of the optical fiber 1 and a low optical feedback from a far end thereof. Therefore, the amplifier 14 amplifies the output signal of the optical receiver 13 using its variable gain, and inputs the signal to the A/D converter 15.

That is, the dynamic range is increased, by decreasing the gain of the amplifier 14 with respect to a high optical feedback from the near end of the optical fiber 1 and by increasing the gain of the amplifier 14 with respect to a low optical feedback from the far end thereof.

The level of Fresnel reflection is greater than that of the backscattered light at least by 40 dB. Because the level of the Fresnel reflection rises so suddenly, it may be difficult to adjust the gain of the amplifier 14 so as to suitably respond to the level of this Fresnel reflection. At this time, an excessive signal which is greater than the maximum input value $(2^N-1)Vr$ in the design is input to the A/D converter 15.

When this excessive signal is input, some A/D converter may output a wrong digital signal. Particularly, pipeline A/D converters may output large noise n in the downward direction, as shown by a broken line of FIG. 6. This noise remarkably interferes the measurement. Flash-type A/D converters do not output such noise. However, flash-type A/D converters use a larger amount of power than that used by the pipeline A/D converters, and are expensive, thus are not commonly available or adopted.

One method for preventing the occurrence of the noise in the pipeline A/D converter is to decrease the entire level of the signal to be input to the A/D converter. However, this method involves deterioration of the S/N ratio, and results in a difficulty in analysis of particularly the characteristics of the far end.

Another possible method is to use some A/D converter whose maximum input voltage is larger. In this case however, the number N of bits of output data inevitably needs to be increased in order to obtain required voltage resolution. In addition, it is necessary to newly design following circuits (memory 16 and controller 18) which handle the output data. As a result, this method causes a new problem that the current resources (such as the hardware, software, etc.) cannot be reused.

SUMMARY OF THE INVENTION

To overcome this problem, an object of the present invention is to provide an OTDR which can avoid the occurrence of noise in an A/D converter at the time an excessive input is applied even if an inexpensive pipeline A/D converter is used, without deteriorating the S/N ratio or wasting the resources, such as the hardware, software, etc. that follow the A/D converter.

To achieve the above object, an OTDR according to a first aspect of the present invention includes:

a pulse light source (11) which emits a light pulse to one end side of an optical fiber (1) as a target object to be tested;

an optical receiver (13) which receives the light returning to the one end side of the optical fiber in response to the emitted optical pulse;

an A/D converter (26) which receives a signal from the optical receiver and converts the signal into an N+A bit digital signal so as to output the digital signal, where the N is a predetermined number of bit(s) to be finally obtained and the A is a predetermined additional number of bit(s);

data compression means (27) for compressing the N+A bit digital signal output from the A/D converter to N bit data; and a controller (18) which implements a process for the digital signal compressed to the N bit data so as to measure transmission characteristics of the optical fiber as the target object to be tested.

According to a second aspect of the present invention, there is provided the OTDR according to the first aspect, wherein the data compression means outputs, of the N+A bit digital signal output from the A/D converter, an arbitrary series of N bit data, when there is no bit of "1" in higher-order bits than a most significant bit in the arbitrary series of N bit data, and outputs N bit data all of whose bits are "1", when there is at least one bit of "1" in the higher-order bits.

Accordingly, the OTDR of the present invention includes the A/D converter (26) and the data compression means (27). The A/D converter has the number of bits that is greater than the number N of bits by A bit(s) (A is an integer) and converts an input signal to an N+A bit digital signal so as to output it. The data compression means compresses the N+A bit digital signal output from the A/D converter to N bit data. Due to this configuration, the allowable input to the A/D converter can be increased to $2^A$ times the normal level, without increasing the number of outputs bits. Further, it is possible to avoid the occurrence of noise at the time an excessive input is applied to the A/D converter, without wasting the resources (such as the hardware, software, etc.) following the A/D converting unit, eve if a reasonably available pipeline A/D converter is used.

DETAILED DESCRIPTION OF THE PREFERRED EMBODIMENT

Descriptions will now be made to an embodiment of the present invention based on the drawings.

Figure 1:
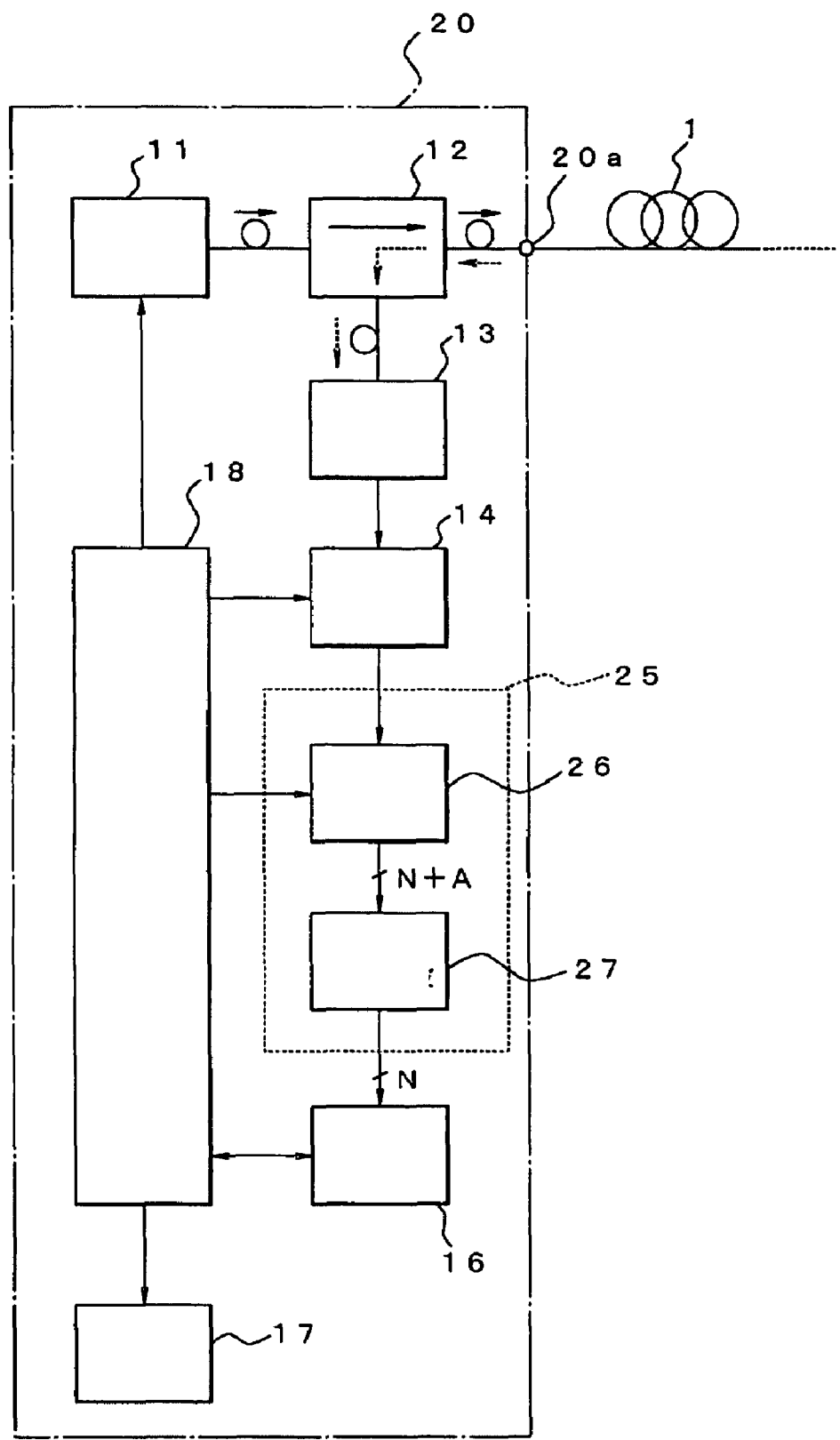
FIG. 1 is a diagram showing a configuration of an embodiment of the present invention.

FIG. 1 shows a configuration of an OTDR 20 according to the present invention. The OTDR 20 has a pulse light source 11, an optical coupler 12, an optical receiver 13, an amplifier 14, a memory 16, a display unit 17 and a controller 18. These constituent elements are the same as those of the conventional OTDR, thus are identified by the same reference numerals.

In this optical pulse test OTDR 20, an optical pulse emitted from the pulse light source 11 is launched onto one end of the optical fiber 1 as a target object to be tested through the optical coupler 12 and a port 20a. Further, the light (backscattered light or Fresnel reflection, etc.) returning to the one end side of the optical fiber 1 in response to the optical pulse is transmitted into the optical receiver 13 from the optical coupler 12, and an output signal of the optical receiver 13 is amplified by the amplifier 14 so as to be input to an A/D converting unit 25.

The voltage of the signal input to the A/D converting unit 25 is set in the range of 0 to $(2^N-1)$ Vr in the design, based on the number N of bits and a 1 bit equivalent voltage Vr. In addition, the memory 16 and the controller 18 implement processes in the unit of the N bits.

As described above, the controller 18 controls the timing to emit the optical pulse of the pulse light source 11, controls a variable gain of the amplifier 14, controls the sampling timing of the A/D converting unit 25, controls the address specification of the memory 16, and implements a calculation process (logarithmic process, etc.) for N bit data. Further, the controller generates waveform data to be displayed by the display unit 17.

The A/D converting unit 25 converts an output signal of the amplifier 14 into an N-bit digital signal, in a manner similar to the process of the A/D converter 15 of the conventional OTDR. However, their internal processes differ from each other.

This A/D converting unit 25 has the number of bits which is larger than the number of N bits, by an additional number of A bit(s) (A is an integer). The A/D converting unit 25 includes a pipeline A/D converter 26 and data compression means 27. The A/D converter 26 converts an input signal into an N+A bit digital signal so as to output the converted signal. The data compression means 27 compresses the N+A bit digital signal output from the A/D converter 26 to an N bit signal.

In other words, the A/D converter 26 permits the input of a signal up to $(2^{N+A}-1)$ Vr, and converts the input signal to an N+A bit digital signal. That is, the maximum level of the input voltage range is increased by about $2^A$ times (A is an integer) compared with the voltage range (between 0 and $(2^N-1)$Vr) in the design of N-bit representation.

For example, in the case where N=10, A=1 and Vr=1 mV, the A/D converter 26 permits the input signal whose voltage range is between 0 and 2047 mV (i.e. twice the designed voltage range of 0 to 1023 mV). Within this range, even if a signal (e.g. 1280 mV) whose value exceeds the designed voltage range of 0 to 1023 mV is input, the value has an enough allowance in the input range of the A/D converter 26. As a result, the converting unit 26 outputs 11 bit data [1010000000] corresponding to the input signal, without the occurrence of noise.

The output data of this A/D converter 26 is input to the data compression means 27 so as to be compressed to N bit data.

Though the compression process is arbitrary, the simplest approach is the limiter process.

Figure 2:
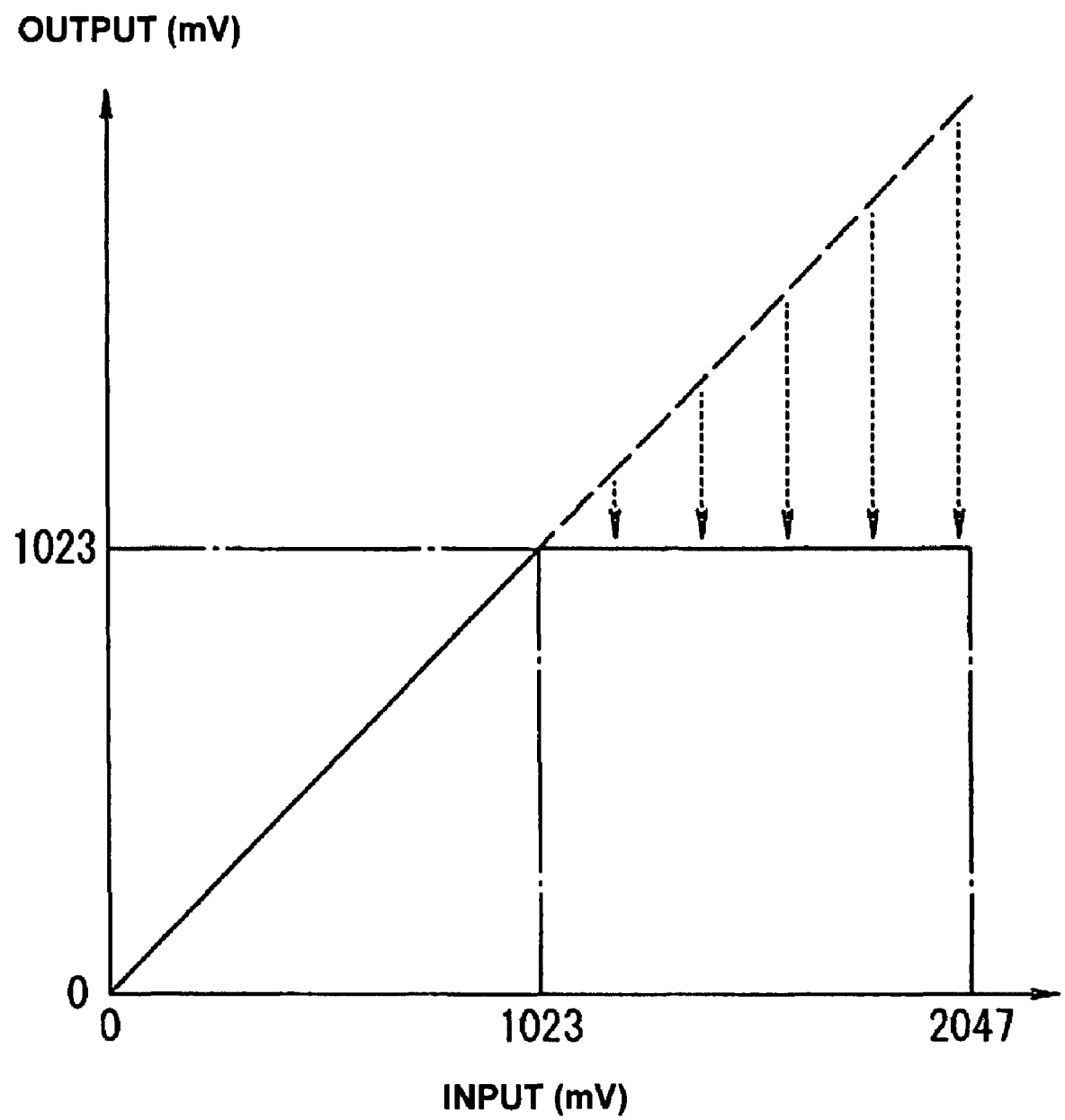
FIG. 2 is a diagram showing an operational example of the principal part of the embodiment.

In the case of the limiter process, as shown in FIG. 2, the low-order 10 bits are output as N bit data as they are, if the voltage of the input signal is between 0 and 1023 mV. If the voltage of the input signal exceeds 1024 mV (if the most significant bit (i.e. the 11th bit) is "1"), 10 bit data composed of all "1" bits is output as N bit data.

In the above case where N=10 and A=1, the low-order N bit data are output as they are if the 11th bit is "0", and the N bit data of the entire bits of "1" is output if the 11th bit is "1". In consideration that A is greater than 1, more generally, of N+A bit digital signals output from the A/D converter 26, arbitrary series of N bit data are output, when there is no bit of "1" in the higher-order bits than the most significant bit of the arbitrary series of N bit data. On the contrary, N bit data all of whose bits are "1" are output, when there is at least one bit of "1" in the higher-order bits. This enables the above limiter process.

Figure 3:
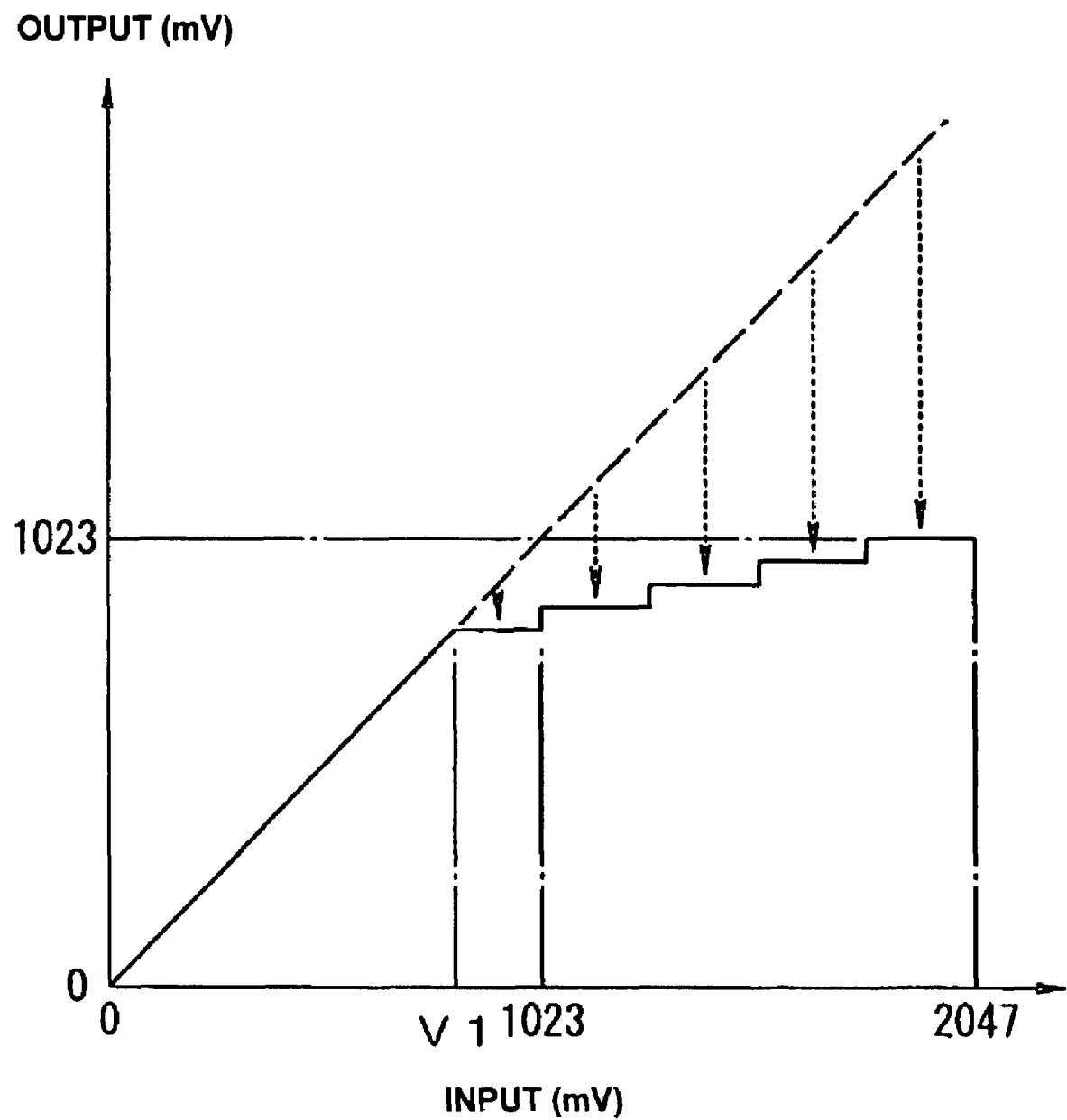
FIG. 3 is a diagram showing an operational example of the principal part of the embodiment.

As described above, not only the hard limiting process for fixing the value beyond a predetermined value implemented, but also a soft limiting process for gently increasing and decreasing the value may be implemented. For example, as shown in FIG. 3, similarly to the above, the low-order 10 bits are output as N bit data as they are, in the range where the voltage of the input signal is between 0 and V1 which is lower than 1023 mV (e.g. 767 mV). On the contrary, 10 bit data which increases in stages up to 1023 mV at predetermined intervals is output as N bit data, in the range where the voltage of the input signal is between V1 and 2047 mV.

Figure 4:
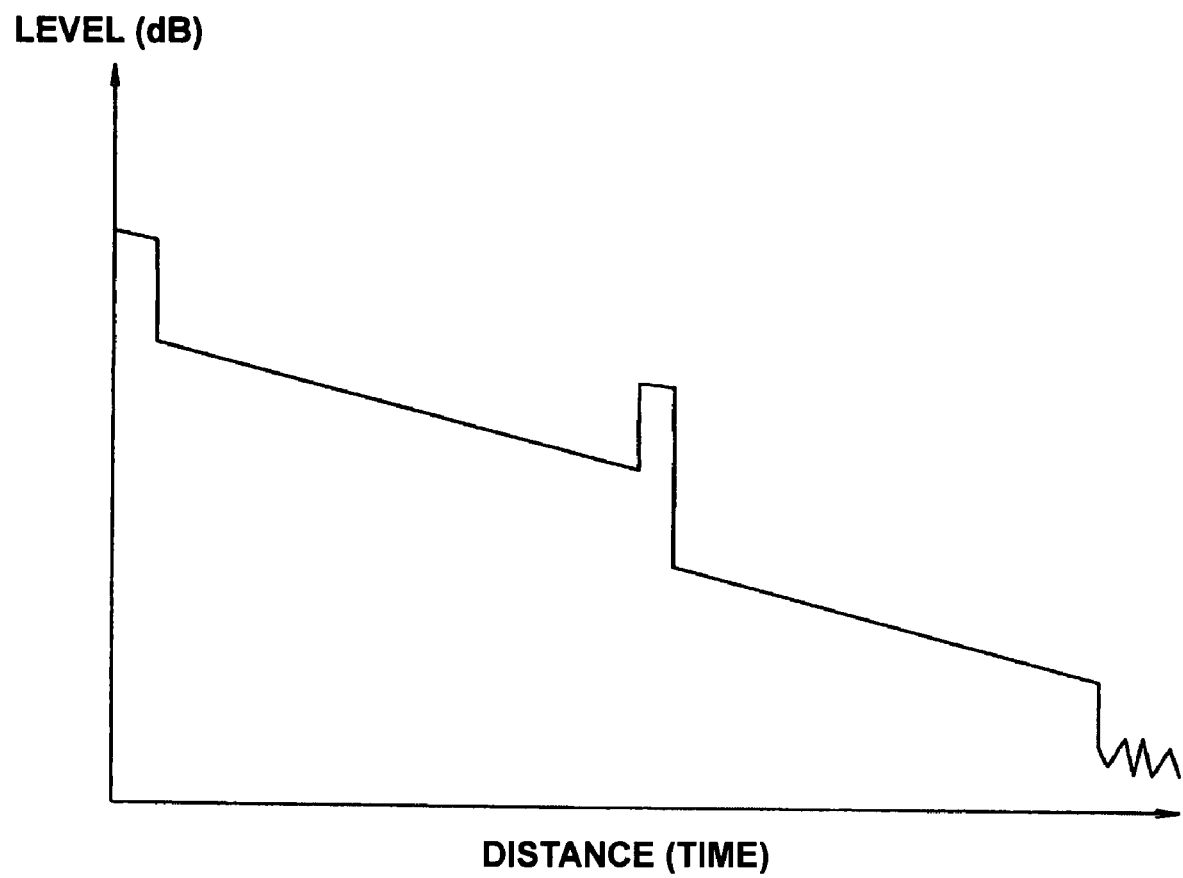
FIG. 4 is a diagram showing a display example of a measured result in the embodiment.

Similarly to the conventional OTDR, a series of N bit data output from the A/D converting unit 25 are stored in the memory 16, in a period of time beginning from the launch of the optical pulse to the optical fiber 1 until the elapse of a predetermined period. The controller 18 implements a logarithmic calculation process, etc. for the stored N bit data, generates waveform data representing the characteristics of the optical fiber 1, and displays the data on the display screen of the display unit 17 as shown in FIG. 4. The displayed waveform data makes it possible to know attenuation characteristics of each position or connection loss in the optical fiber 1.

The A/D converting unit 25 of the thus formed OTDR 20 can permit the voltage input to the A/D converter 26, up to a voltage level which is about $2^A$ times greater than that of the conventional OTDR. Even when an input voltage is greater than an expected voltage, noise from the A/D converter 26 can be avoided.

The N+A bit data output from the A/D converter 26 is compressed to N bit data through the process of the data compression means 27. Therefore, the same configuration as the conventional OTDR can be applied to the hardware and software of the following memory 16 and the controller 18, and such previous resources can effectively be used.

Figure 5:
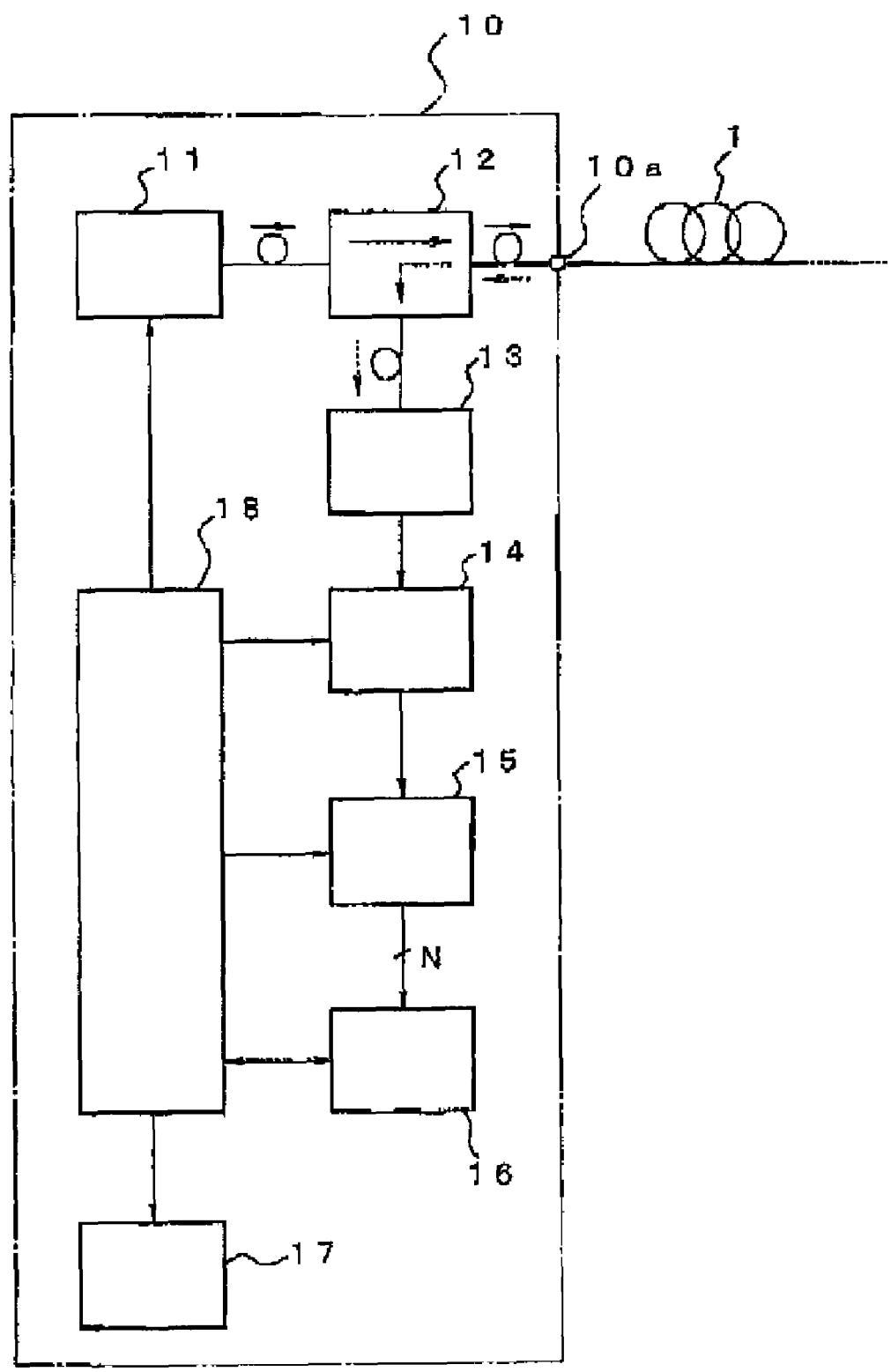
FIG. 5 is a diagram showing a configuration of a conventional OTDR.
Figure 6:
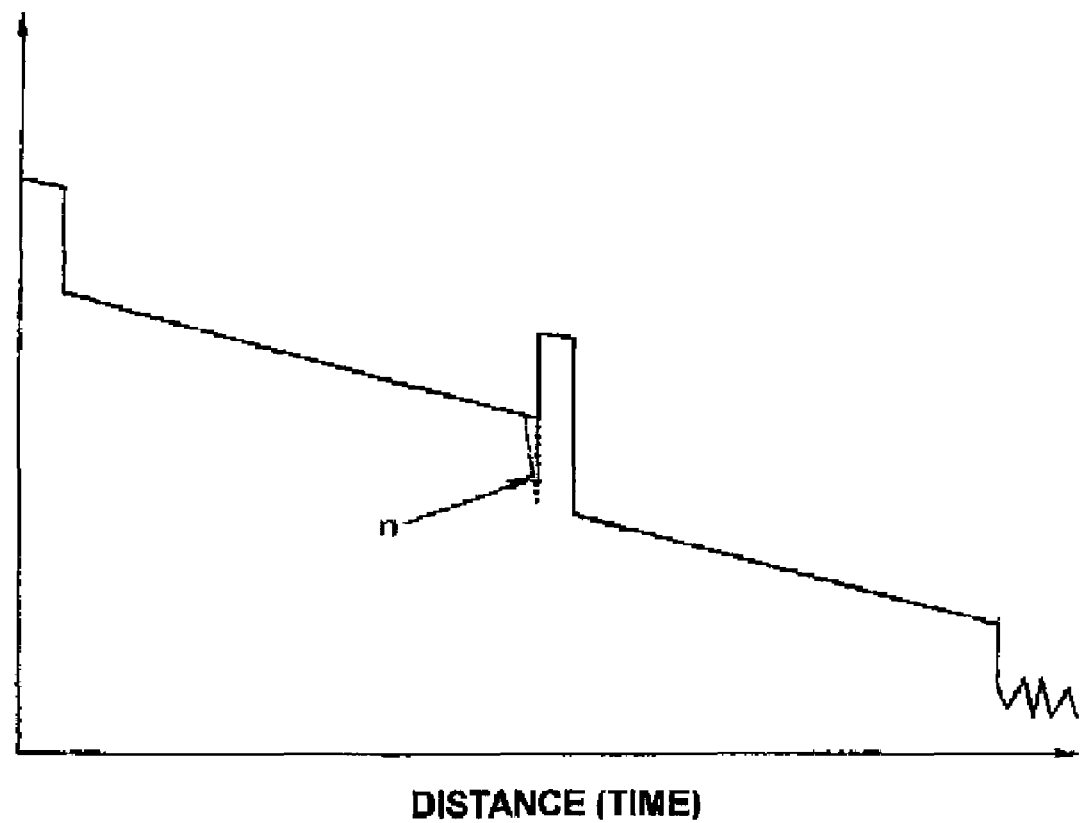
FIG. 6 is a diagram showing a display example of a measured result in the conventional OTDR.

FIG. 1
11 PULSE LIGHT SOURCE
13 OPTICAL RECEIVER
14 AMPLIFIER
16 MEMORY
17 DISPLAY UNIT
18 CONTROLLER
26 A/D CONVERTER
27 DATA COMPRESSION MEANS
FIG. 5
11 PULSE LIGHT SOURCE
13 OPTICAL RECEIVER
14 AMPLIFIER
15 A/D CONVERTER
16 MEMORY
17 DISPLAY UNIT
18 CONTROLLER

What is claimed is:

1. An optical time domain reflectometer (OTDR) comprising:
a pulse light source which emits a light pulse to one end side of an optical fiber as a target object to be tested;
an optical receiver which receives the light returning to the one end side of the optical fiber in response to the emitted optical pulse;
an A/D converter which receives a signal from the optical receiver and converts the signal into an N+A bit digital signal so as to output the digital signal, the N being a predetermined number of bit(s) to be finally obtained and the A being a predetermined additional number of bit(s) and the A being an integer greater than "0";
data compression means for compressing the N+A bit digital signal output from the A/D converter to N bit data; and
a controller which implements a process for the digital signal compressed to the N bit data so as to measure transmission characteristics of the optical fiber as the target object to be tested,
wherein the A/D converter is a pipeline A/D converter, and the data compression means outputs, of the N+A bit digital signal output from the A/D converter, an arbitrary series of N bit data, when there is no bit of "1" in higher-order bits than a most significant bit of the arbitrary series of N bit data, and outputs N bit data all of whose bits are "1", when there is at least one bit of "1" in the higher-order bits.

2. The OTDR according to claim 1, further comprising:
a memory which stores data output from the data compression means, beginning from a timing to emit the optical pulse to the optical fiber until elapse of a predetermined period of time,
wherein the controller implements a process for the data stored in the memory so as to generate waveform data representing characteristics of the optical fiber.

3. The OTDR according to claim 2, further comprising a display unit which displays the waveform data generated by the controller.

4. The OTDR according to claim 1, wherein the number N of bit(s) is greater than the number A of bit(s).

5. The OTDR according to claim 1, wherein the number A of bit(s) is to provide the A/D converter with a tolerable value for a signal level to be input to the A/D converter whose voltage range to be input is greater than a voltage range of an A/D converter outputting N bit data.

6. An optical time domain reflectometer (OTDR) comprising:
a pulse light source which emits a light pulse to one side of an optical fiber as a target object to be tested;
an optical receiver which receives the light returning to the one end side of the optical fiber in response to the emitted optical pulse;
an A/D converter which receives a signal from the optical receiver and converts the signal into N+A bit digital signal so as to output the digital signal, the N being a predetermined number of bit(s) to be finally obtained and the A being a predetermined additional number of bit(s) and the A being an integer greater than "0";
data compression means for compressing the N+A bit digital signal output from the A/D converter to N bit data; and
a controller which implements a process for the digital signal compressed to the N bit data so as to measure transmission characteristic of the optical fiber as the target object to be tested,
wherein the A/D converter is a pipeline A/D converter, and
wherein the data compression means outputs, of the N+A bit digital signal output from the A/D converter, N bit data including an arbitrary series of M bits, when there is no bit of "1" in a bit which is higher order than a most significant bit in the arbitrary series of M bits (M<N), and outputs N bit data which is incremented in stages in accordance with a size of the N+A bit digital signal output from the A/D converter, when there is data of "1" in the high order bit.

7. An optical time domain reflectometer (OTDR) comprising:
a pulse light source which emits an optical pulse to one end side of an optical fiber as a target object to be tested;
an optical receiver which receives the light returning to the one end side of the optical fiber in response to the emitted optical pulse;
a pipeline A/D converter which receives a signal from the optical receiver and converts the signal into an N+A bit digital signal so as to output the digital signal, the N being a predetermined number of bit(s) to be finally obtained and the A being a predetermined additional number A of bit(s) and the A being an integer greater than "0";
data compression means for outputting, of the N+A bit digital signal output from the A/D converter, an arbitrary series of N bit data, when there is no bit of "1" in higher-order bits than a most significant bit of the arbitrary series of N bit data, and outputting N bit data all of whose bits are "1", when there is at least one bit of "1" in the higher-order bits; and
a controller which implements a process for the N bit data output from the data compression means so as to measure transmission characteristics of the optical fiber as the target object to be tested.

8. The OTDR according to claim 7, further comprising:
a memory which stores the data output from the data compression means beginning from a timing to emit the optical pulse to the optical fiber until elapse of a predetermined period of time,
wherein the controller implements a process for the data stored in the memory so as to generate waveform data representing characteristics of the optical fiber.

9. The OTDR according to claim 8, further comprising a display unit which displays the waveform data generated by the controller.

* * * * *